J. C. KITTON.
AUTOMATIC PRESSURE REGULATING VALVE.
APPLICATION FILED SEPT. 11, 1916.

1,255,538.

Patented Feb. 5, 1918.
2 SHEETS—SHEET 1.

Witness
Charles Balg
Karl H. Butler

Inventor
John C. Kitton.
By
Attorneys

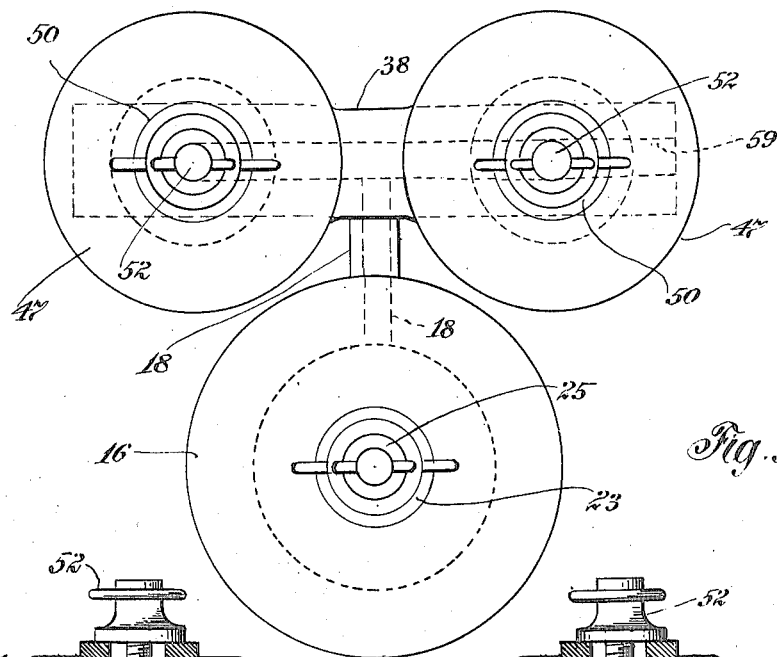
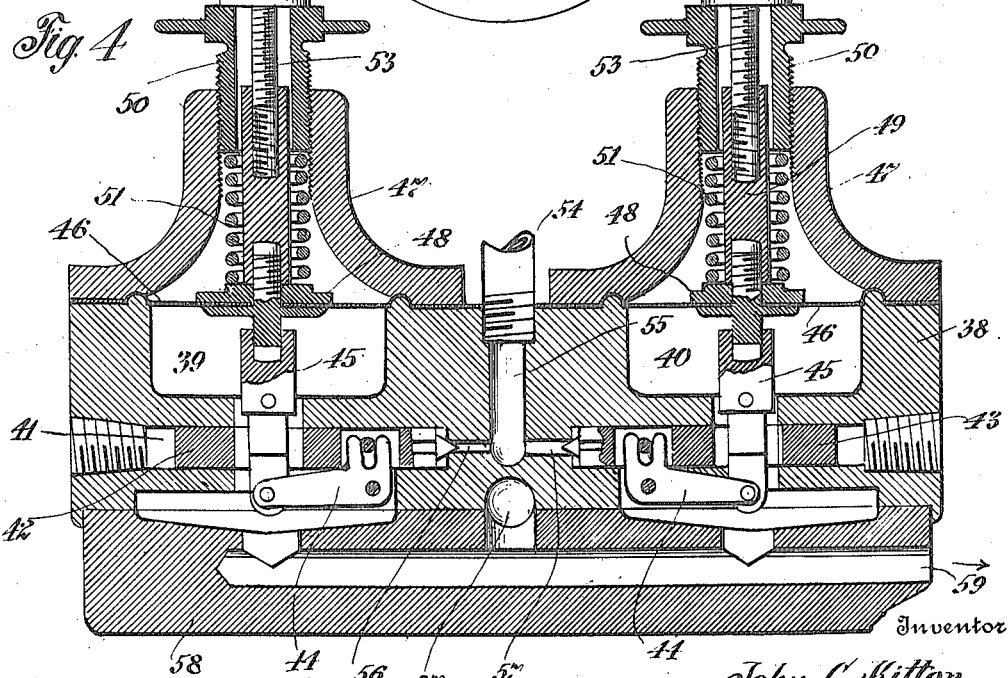

UNITED STATES PATENT OFFICE.

JOHN C. KITTON, OF CHICAGO, ILLINOIS.

AUTOMATIC PRESSURE-REGULATING VALVE.

1,255,538.     Specification of Letters Patent.    Patented Feb. 5, 1918.

Application filed September 11, 1916. Serial No. 119,343.

*To all whom it may concern:*

Be it known that I, JOHN C. KITTON, a citizen of the United States of America, residing at Chicago, in the county of Cook and State of Illinois, have invented certain new and useful Improvements in Automatic Pressure-Regulating Valves, of which the following is a specification, reference being had therein to the accompanying drawings.

This invention relates to automatic pressure regulating valves and in my companion applications filed under even date, for certain improvements in a refrigeratory apparatus or system, these valves have been referred to as primary and dual regulating valves, and as such may be advantageously used for regulating the pressure of ammonia gas to a compressor to facilitate starting the same.

The automatic pressure regulating valves to be described are not necessarily limited to such use, and the invention, *per se*, resides in the novel automatic controlling means, the coöperation of valves for various pressures, and means whereby the automatic controlling means may be rendered inactive or the automatic valves converted into shut-off valves.

My invention further resides in a valve construction which permits of a portion of the valve being submerged and the remaining portion of the valve exposed for adjustment.

These and other features of my invention will be hereinafter brought out and reference will now be had to the drawing, wherein, Figure 1 is a vertical sectional view of the primary valve;

Fig. 3 is a plan of the valves, and

Fig. 4 is a longitudinal section of the dual valves.

Figure 1:
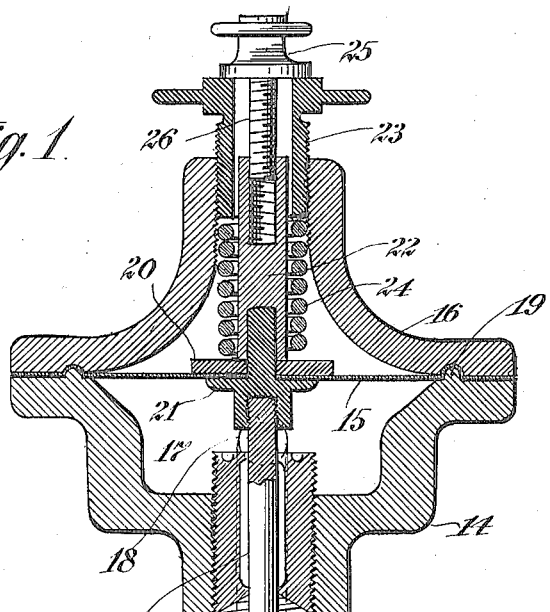
Figure 2:
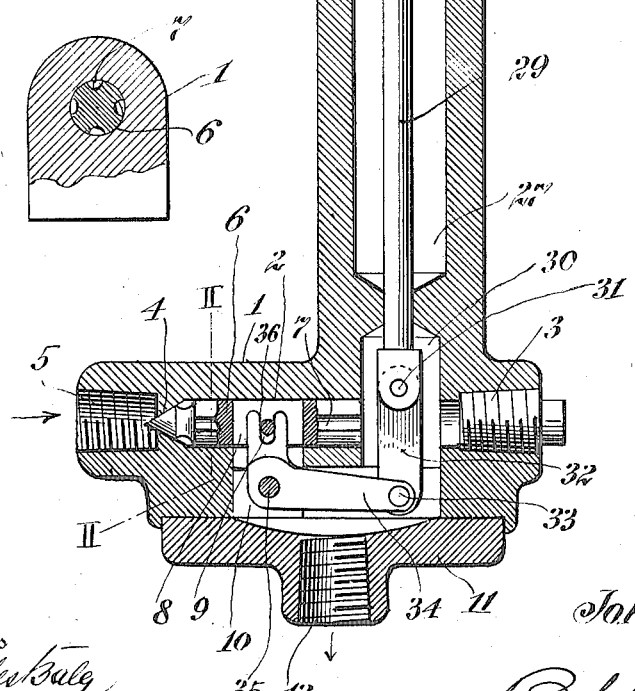
Fig. 2 is a cross sectional view taken on the line II—II of Fig. 1.

Considering the primary valve, 1 denotes a valve body provided with a longitudinal bore 2 and one end of the bore is closed by a plug 3, while the opposite end of the bore terminates in a valve seat 4 communicating with an inlet opening 5. Slidable in the bore 2 is a needle valve 6 having the walls thereof longitudinally grooved or scored, as at 7, and intermediate the ends of said needle valve is a slot 8 and a pin 9 crosswise of the slot.

The bottom of the valve body 1 has an opening 10 in communication with the bore 2 and closing the greater part of the opening 10 is a bottom plate 11 suitably connected to the valve body 1 and provided with an outlet opening 12.

Forming part of the valve body 1 is a tubular column 13 having the upper end thereof provided with a diaphragm body 14 closed by a diaphragm 15 and a cap 16 suitably connected to the body 14. The diaphragm body 14 provides a pressure chamber 17 having an inlet connection 18, the greater portion of which is shown by dotted lines in Fig. 1.

The diaphragm 15 has the marginal edges thereof held between the body 14 and the cap 16 and particularly upon a rib 19 carried by the body 14 and extending into the cap 16. Connected to the diaphragm 15 are coupling members 20 and 21, the latter extending through the diaphragm 15 and the coupling member 20 to hold a socket member 22 above the diaphragm and in the cap 16. Screwed into the cap 16 is a hollow nut 23 and between the inner end of the nut and the coupling member 20 is a coiled expansion spring 24, said spring encircling the socket member 22 with the expansive force of said spring tending to flex and lower the diaphragm 15. The tension of the spring 24 may be regulated by the nut 23 and on said nut is another nut 25 for a screw 26, said screw being in screw-threaded engagement with the socket member 22, whereby the socket member may be manually raised to hold the diaphragm 15 stationary against any action of the spring 24 or pressure within the chamber 17.

The column 13 has a stuffing box 27 and a stuffing box gland 28 for a rod 29, said rod having the upper end thereof adjustably connected to the coupling member 21 within the chamber 17 and the lower end thereof extending into a vertical portion 30 of the opening 10 in the bottom of the valve body 1. The lower end of the rod 29 is pivotally connected, as at 31, to a link 32 and said link is pivotally connected, as at 33, to the long arm of a bell crank 34. This bell crank is pivoted upon a pin 35 disposed transversely of the opening 10, and the short arm of said bell crank is bifurcated or slotted, as at 36, to engage the pin 9 of the needle valve 6.

Considering the valve for general purposes, a pressure of gas or fluid in the chamber 17, above that pressure for which the spring 24 is adjusted, will flex and raise the diaphragm 15. This diaphragm, by reason of the rod 29, link 32 and bell crank 34, will shift the needle valve 6 toward the seat 4 and regulate or shut off the passage of fluid or gas through the valve body 1.

The inlet connection 18 of the primary valve is in communication with a port 37 of a dual valve body 38 and this dual valve body is a combination of the bodies 1 and 14 of the primary valve. The dual valve body has pressure chambers 39 and 40, plugged bores 41 in communication with said chambers, needle valves 42 and 43 slidable in said bores, pivoted bell cranks 44 for moving said needle valves, and rods 45 connected to said bell cranks and extending into the pressure chambers 39 and 40.

On the dual valve body 38 are diaphragms 46 and caps 47, the diaphragms 46 have coupling members 48 connected to the rods 45 and to socket members 49. The caps 47 have regulating nuts 50 for compression springs 51 within said caps, and on the nuts 50 are nuts 52 for screws 53 adapted for shifting the socket members 49. The elements 50 and 51 constitute means for regulating flexure of the diaphragms 46, and the elements 49, 52 and 53 constitute means for holding the diaphragms against flexure and the needle valves 42 and 43 locked.

Connected to the dual valve body 38, intermediate the pressure chambers 39 and 40, is a pressure inlet pipe 54 communicating with a port 55 and this port has a small branch 56 communicating with one of the bores 41 and a large branch 57 communicating with the other bore. The needle valve 42 controls a small branch 56 and the needle valve 43 controls the large branch 57. The dual valve body 38 has a bottom plate 58 provided with a pressure outlet port 59, said pressure outlet port being in communication with the pressure chambers 39 and 40 and the port 37 leading to the primary valve.

Considering the operation of the dual valve in connection with the primary valve, I will assume that the port 59 of the dual valve is connected to a compressor adapted by suction or a reduction of atmospheric pressure to draw gas from the port 59. I will further assume that the pipe 54 is connected to a suitable source of gas, preferably a generator in the form of a heat absorbing device; that the diaphragm 46 of the pressure chamber 39 is set for actuation by twenty-five pound pressure; that the diaphram of pressure chamber 40 is set for actuation by twenty pounds pressure, and that the diaphragm 15 of the primary valve is set for actuation by fifteen pounds pressure. As brought out in my companion application on the refrigeratory apparatus, the compressor that is in communication with a continuously operating gas generator will be choked with an excessive pressure and thus retard the starting of the compressor after a cessation in operation. It is further pointed out that the three valves forming the subject matter of this application automatically control the pressure of gas to the compressor and the supply of material to the gas generator. When the compressor is shut down and a back pressure accumulates, any excessive pressure over fifteen pounds will first flex the diaphragm 15 of the primary valve, close the needle valve 6, and shut off the supply of material to the gas generator. As the pressure rises the diaphragm 46 of the chamber 40 is next affected, and the needle 43 closed, and eventually the diaphragm of the first chamber 39 will be flexed to close the needle valve 42. The supply of gas will therefore be completely shut off to the compressor. In starting up a compressor, it is therefore evident that the pressures in the chambers 17, 39 and 40 must be progressively reduced before the compressor is placed in direct communication with the gas generator, and it is this manner of stepping down excessive pressures that the three valves coöperate as automatic pressure regulators.

The preferred construction of each valve has been illustrated, but it is to be understood that the structural elements are susceptible to such changes as fall within the scope of the appended claims.

What I claim is:—

1. An automatic pressure regulating valve comprising a valve body having communicating inlet and outlet openings, a needle valve in said valve body controlling the communication between the inlet and outlet openings, a column carried by said valve body, a diaphragm body on said column and having a pressure inlet opening, a diaphragm in said body, means extending to said column and articulating said diaphragm and said needle valve so that flexure of said diaphragm actuates said needle valve, a screw in the top of said body adapted for regulating the flexure of said diaphragm, and means engaging the top of said screw and extending through said screw and articulated with said diaphragm adapted for moving said diaphragm to close said needle valve.

2. Automatic pressure regulating means comprising a valve body having communicating inlet and outlet openings, a needle valve in said body controlling the communication between said openings, a column carried by said valve body, a diaphragm body on said column providing a pressure chamber, a dual valve body connected to said column and having pressure chambers communicating with the pressure chamber of said diaphragm body by ports of different sizes, longitudinally alining needle valves movable to and from the ports of said dual valve body controlling pressure to the chambers of said dual valve body, diaphragms in all of said pressure chambers, means extending past said needle valves and articulating said diaphragms and said needle valves so that flexure of said diaphragms actuates said needle valves, means on said diaphragm and dual valve bodies adapted for regulating the flexure of said diaphragms and means extending through said regulating means adapted for moving said diaphragms to close said needle valves.

In testimony whereof I affix my signature in presence of two witnesses.

JOHN C. KITTON.

Witnesses:
 ANNA M. DORR,
 KARL H. BUTLER.